Feb. 2, 1937.  H. R. MOYER  2,069,534
ROLLER
Filed Sept. 20, 1935

WITNESSES:

INVENTOR
Howard R. Moyer
BY
ATTORNEY

Patented Feb. 2, 1937

2,069,534

UNITED STATES PATENT OFFICE 2,069,534

ROLLER

Howard R. Moyer, Wilkinsburg, Pa., assignor to Westinghouse Electric & Manufacturing Company, East Pittsburgh, Pa., a corporation of Pennsylvania Application September 20, 1935, Serial No. 41,409

7 Claims. (Cl. 74—230.3)

This invention relates to rollers and particularly to noiseless rollers.

In many applications, it is desirable to provide rollers which are noiseless in operation but strong enough for withstanding the wear encountered under working conditions. This is particularly true with respect to rollers employed as the step rollers in electric stairways.

An object of this invention is to provide a noiseless roller.

Another object of this invention is to provide a noiseless roller that may be economically manufactured and which is durable.

A more specific object of this invention is to provide a roller having a tread of non-metallic material united with a molded web.

Figure 1:
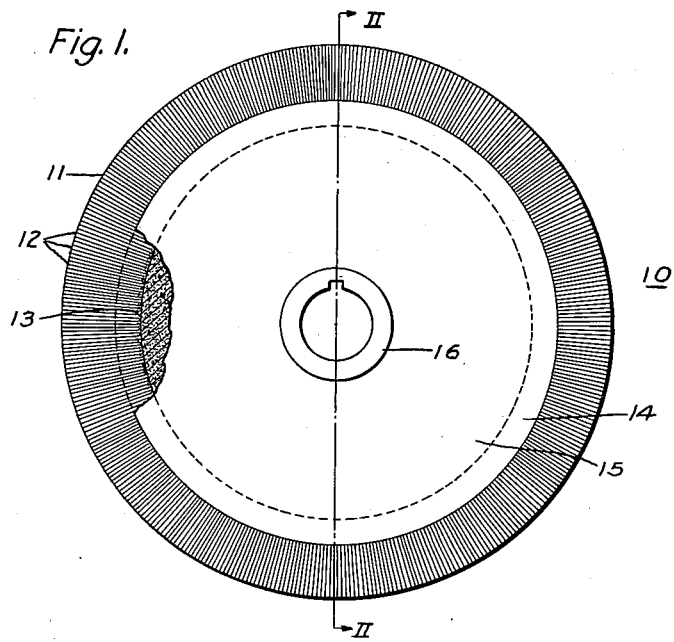
Figure 2:
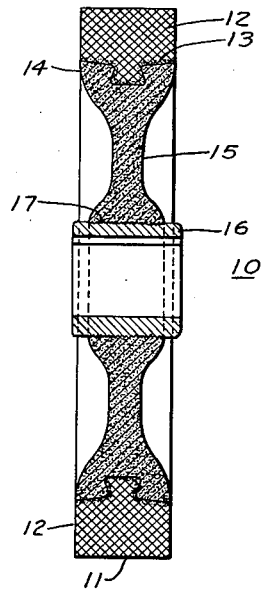

Other and further objects of this invention will appear from reading the accompanying specification and claims in connection with the accompanying drawing, in which Figure 1 is a plan view, with part broken away, of a roller constructed in accordance with this invention, and Fig. 2 is a view in section taken along the line II—II of Fig. 1.

In electric stairways, the steps are moved over a plurality of rollers commonly called step rollers. For satisfactory operation of the stairways, rollers that are silent when contacting the moving steps and durable are desired. In order to produce a noiseless roller, it is necessary to provide the roller with a tread that will not cause vibrations when the steps and rollers contact.

Referring to the drawing, a roller 10 is provided with a non-metallic tread 11. The tread is constructed from fibrous material, such as cloths of woven fabrics, paper or wood, etc., or non-fibrous material, such as leather or rawhide.

In order to provide a compact tread, a plurality of section-members 12 are cut, stamped or punched into the desired shape and size from the non-metallic material referred to hereinbefore. The section-members are compressed into the form of the tread by placing them in a suitable press and subjecting them to the required pressure.

In order to provide a mechanical interlock between the tread and web, the purpose of which will be explained hereinafter, the section-members 12 are stamped of a shape to provide a tongue 13 on one side of the section-members and when a plurality of section-members are arranged and compressed to form a tread, the tongues 13 form an inwardly extending and continuous flange 14.

A web 15 is provided for supporting the compacted tread 11. The web 15 comprises a fibrous material impregnated with a phenolic, urea or other condensation resin product so molded under heat and pressure to the inner face of tread 11 that it envelops the inwardly extending flange 14 and supports the tread. In enveloping the flange 14, the tread and web are mechanically interlocked for providing a strong joint therebetween.

In practice, the web 15 is molded to a hub 16 simultaneously with the molding of the web about the tread 11. As shown in Fig. 2 of the drawing, the outer surface 17 of the hub 16 is usually roughened for providing a surface to which the molding material of which the web is formed may be easily bonded. In place of the hub 16 shown in the drawing, a bearing or bearing sleeve may be molded in the center of the web 15.

In order to provide strength to the tread and to keep the edges of the section-members from fraying over the sides of the web when a heavy load is placed on the tread, the section-members 12 are disposed transversely to the periphery of the roller. Where extremely heavy loads are placed on the tread, a slight relative movement between the transverse and compacted section-members may be noticed.

In order to reduce the chafing or frictional effect between the contacting surfaces of the compacted section-members where cloth or other fibrous materials are employed in the tread, a powdered solid lubricant such as talc, starch or pulverized graphite may be rolled into the fibrous material prior to stamping out the section-members.

In a specific embodiment of this invention, the section-members 12 are stamped from cotton cloth, which has been previously filled with talc to reduce the friction between the contacting surfaces. The section-members 12 are arranged in an annular form and are compressed into the desired size of the tread with a continuous flange 13 formed on the inner side thereof. After the tread has been formed, it is placed in a suitable mold and a comminuted material impregnated with phenolic resin is applied thereto for forming the web 15. A hub or bearing sleeve 16 is so positioned in the mold that when heat and pressure are applied to the impregnated comminuted material, the web is formed enveloping the flange 14 and bonding with the roughened surface 17 of the hub or bearing sleeve.

It is to be noticed that under the action of heat and pressure, the resin with which the comminuted material is impregnated flows and penetrates into the inner portion of the tread effectively bonding the tread with the web. This action of the binder in penetrating the tread is sufficient for binding the tread to the web where slight loads are to be applied to the finished roller, and it is, therefore, evident that where the roller is to be employed with such slight loads that the flange 14 need not be formed on the tread. However, it is desirable to employ both the interlocking flange and the action of the binder in penetrating the inner portion of the tread in making the joint between the tread and the web.

A roller produced in accordance with this invention is cheap in manufacture, noiseless in operation and is capable of withstanding heavy loads which may be encountered under working conditions. It is to be understood that although this invention has been described with reference to step rollers employed in electric stairways, it is also applicable for producing wheels, tires or the like where it is desired to eliminate noise in operation.

Although this invention has been described with reference to a specific embodiment thereof, it is, of course, to be understood that other and various modifications thereof are possible. It is, therefore, not to be restricted except insofar as is necessitated by the prior art and the scope of the appended claims.

I claim as my invention:

1. A roller comprising in combination, a plurality of section-members arranged in a circle to provide a tread, a tongue provided on each section-member, the tongues being disposed to present an inwardly extending flange when the section-members are arranged to form a tread, a web of fibrous material impregnated with a binder molded to the inner face of the tread enveloping the flange, and a hub disposed in the center of the web.

2. A roller comprising, in combination, a plurality of non-metallic section-members arranged in a circle to provide a tread, the section-members being disposed transversely to the periphery of the tread and compressed into a compact unit, a web of fibrous material impregnated with a binder molded to the inner face of the tread, the binder penetrating the inner portion of the tread to unite the tread with the web, and a hub disposed in the center of the web.

3. A roller comprising in combination, a plurality of non-metallic section-members arranged in a circle to provide a tread, a tongue provided on each section-member, the tongues being disposed to present an inwardly extending flange when the section-members are arranged to form a tread, a web of fibrous material impregnated with a binder molded to the inner face of the tread enveloping the flange, the binder penetrating the inner face of the non-metallic tread when the web is being molded to maintain the tread integral with the web, and a hub disposed in the center of the web.

4. A roller comprising in combination, a plurality of non-metallic section-members arranged in a circle to provide a tread, a tongue provided on each section-member, the section-members being so disposed transversely to the periphery of the tread and so compressed into a compact unit in forming the tread that the tongues of the section-members present an inwardly extending flange when the tread is formed, a web of fibrous material impregnated with a binder molded to the inner face of the tread enveloping the flange, the binder penetrating the inner portion of the tread to unite the tread with the web, and a hub disposed in the center of the web.

5. A roller comprising in combination, a plurality of section-members of fibrous material arranged in a circle to provide a tread, a powdered solid lubricant disposed for filling the fibrous material to reduce chafing between the section-members, a tongue provided on each section member, the section-members being so disposed transversely to the periphery of the tread and so compressed into a compact unit in forming the tread that the tongues of the section-members present an inwardly extending flange when the tread is formed, a web of fibrous material impregnated with a binder molded to the inner face of the tread enveloping the flange, the binder penetrating the inner portion of the tread to unite the tread with the web, and a hub disposed in the center of the web.

6. A roller comprising in combination, a plurality of section-members of fibrous material arranged in a circle to provide a tread, a lubricant consisting of talc disposed for filling the fibrous material to reduce chafing between the section-members, a tongue provided on each section-member, the section-members being so disposed transversely to the periphery of the tread and so compressed into a compact unit in forming the tread that the tongues of the section-members present an inwardly extending continuous flange when the tread is formed, a web of fibrous material impregnated with a binder molded to the inner face of the tread enveloping the flange, the binder penetrating the inner portion of the tread to unite the tread with the web, and a hub disposed in the center of the web.

7. A roller comprising in combination, a plurality of section-members of fibrous material arranged in a circle to provide a tread, a lubricant consisting of talc disposed for filling the fibrous material to reduce chafing between the section-members, a tongue provided on each section-member, the section-members being so disposed transversely to the periphery of the tread and so compressed into a compact unit in forming the tread that the tongues of the section-members present an inwardly extending continuous flange when the tread is formed, a web of comminuted material impregnated with a binder molded to the inner face of the tread enveloping the flange, the binder penetrating the inner portion of the tread to unite the tread with the web, and a hub disposed in the center of the web.

HOWARD R. MOYER.